United States Patent
Miyamoto

(10) Patent No.: US 6,574,277 B1
(45) Date of Patent: Jun. 3, 2003

(54) MOVING-PICTURE CODING APPARATUS AND METHOD

(75) Inventor: Yoshihiro Miyamoto, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/441,788

(22) Filed: Nov. 17, 1999

(30) Foreign Application Priority Data

Nov. 25, 1998 (JP) .......................................... 10-334352

(51) Int. Cl.$^7$ ................................................ H04N 7/32
(52) U.S. Cl. .............................. 375/240.13; 375/240.27
(58) Field of Search ...................... 348/699; 375/240.01, 375/240.03, 240.12–240.16, 240.24, 240.26, 240.27, 240.28; H04N 7/12, 7/32

(56) References Cited

U.S. PATENT DOCUMENTS

| | | | | |
|---|---|---|---|---|
| 5,719,628 A | * | 2/1998 | Ohki ........................... | 348/699 |
| 5,726,711 A | * | 3/1998 | Boyce .................... | 375/240.15 |
| 5,822,006 A | * | 10/1998 | Tahara .................... | 375/240.14 |
| 6,052,415 A | * | 4/2000 | Carr et al. .............. | 375/240.27 |
| 6,125,144 A | * | 9/2000 | Matsumura et al. ... | 375/240.12 |
| 6,282,240 B1 | * | 8/2001 | Fukunaga et al. ...... | 375/240.13 |

* cited by examiner

Primary Examiner—Richard Lee
(74) Attorney, Agent, or Firm—Dickstein, Shapiro, Morin & Oshinsky, LLP.

(57) ABSTRACT

Distance from a small block to a synchronizing pattern inserted into coded data is calculated for each small block in an image frame. On the basis of the count, a data-loss probability estimation unit estimates the probability that coded data of a target small block will be lost during transmission. In regard to a small block in which interframe predictive coding has been performed, an image-quality degradation estimation unit estimates the degree of image-quality degradation that will be caused in this small block in the decoded image. The forced refresh priority of each small block is calculated upon comparing the estimated data-loss probability and estimated degree of image-quality degradation with threshold values, and the values of priority are recorded in the form of a forced refresh map. When the next frame is coded, reference is had to the recorded values of priority and a small block in which intraframe coding will be forcibly performed is selected based upon the recorded values of priority. When some coded data is lost owing to the occurrence of an error, therefore, a decline in the quality of the decoded image can be suppressed in an effective manner.

12 Claims, 10 Drawing Sheets

MOVING-PICTURE CODING APPARATUS AND METHOD

FIELD OF THE INVENTION

This invention relates to an apparatus and method for coding moving pictures. More particularly, the invention relates to a moving-picture coding apparatus and method for suppressing a decline in image quality that accompanies loss of coded data caused by occurrence of an error during transmission.

BACKGROUND OF THE INVENTION

In the conventional apparatus and method for coding moving pictures, intraframe coding or interframe predictive coding is selected and used adaptively in units of small blocks.

FIG. 8 is a flowchart useful in describing the processing procedure of a prior-art control method for selecting the small blocks in which intraframe coding is forcibly performed. When coding is initiated following the start of processing of a moving picture sequence, first a referential forced refresh map is reset in order to select a small block in which intraframe coding is to be forcibly performed (S21). A value indicating the priority at which forced refresh is to be performed is recorded in the map for every small block contained in the image frame.

In the coding of each frame of a moving picture, coding is carried out upon selecting either intraframe coding or interframe predictive coding for each small block (S22 to S30). Before the selection is made, it is determined at S23 whether the small block of interest is a candidate for forced refresh. If the decision rendered is "YES" at S23, intraframe coding is selected (S24); if "NO", then either intraframe coding or interframe predictive coding, whichever provides the higher coding efficiency, is selected (S26). If the intraframe coding mode has been selected for the small block desired to be coded ("YES" at S23), then the forced refresh priority of this block is reset to the lowest level (S25), followed by updating of the forced refresh map (S29).

If interframe predictive coding is selected at S26, the power of prediction error for a case where image data at the same position in a reference frame is adopted as the prediction data is calculated. If this value is greater than a predetermined threshold value, then the forced refresh priority of the block is updated to a higher level (S28), followed by updating of the forced refresh map (S29).

When the processing for coding the small block is completed through the foregoing procedure (S30), control returns to S22 for the processing of the next small block.

FIG. 9 is a block diagram illustrating a moving-picture coding system for implementing the method according to the prior art described above. According to this example of the prior art, the coding system employs motion-compensating interframe prediction. When motion is detected from one frame to the next, the power of frame-to-frame prediction error which prevails when the motion is made zero is actually measured. Accordingly, the value of forced refresh priority is re-calculated for each small block upon referring to interframe prediction error data. Further, if the intraframe coding mode has been selected for a small block of interest, the value of the forced refresh map is reset by a control signal 902.

FIG. 10 is a diagram useful in describing an example of an error suppression method on the decoding side. This diagram conceptually illustrates a method assumed to employ the coding scheme of the prior art described above. In FIG. 10, image data is interpolated by interframe predictive processing assuming that motion and prediction error are zero in small blocks in which data has been lost due to error during transmission. A block expected to have conspicuously poor image quality because this interpolation processing is inappropriate has the priority of its forced refresh raised by the method described above. In accordance with the conventional method, therefore, blocks whose image quality will decline conspicuously owing to loss of data are selected and forced refresh is applied giving priority to these blocks.

SUMMARY OF THE DISCLOSURE

However, certain problems have been encountered in the course of investigations toward the present invention. Namely with the conventional method described above, a problem has been encountered that coding efficiency per se declines when forced refresh is inserted frequently to sufficiently suppress a decline in image quality caused by transmission error. The reason for this is that with the conventional method described above, the calculation of forced refresh priority for each small block does not take into account the fact that the probability of data loss due to transmission error differs from one small block to the next. As a consequence, even small blocks having a low probability of data loss are updated just as frequently as small blocks for which the probability of data loss is high, and the intraframe coding mode, for which the coding efficiency is not always the best, is selected often. In other words, if the frequency with which forced refresh is applied is raised in accordance with the small blocks having the higher probability of data loss, small blocks for which the probability of data loss is low will be updated unnecessarily often. Conversely, if the frequency of updating is made to conform to lower probability, there is a danger that small blocks for which the frequency of data loss is high will remain without being refreshed for an extended period of time during which image quality declines due to error.

Further, with the method according to the prior art, small blocks that are to undergo forced refresh are selected upon referring to the power of simple interframe prediction error. This is because only suppression of error resulting from simple interframe prediction is assumed on the decoding side as well. Accordingly, it is difficult to adjust the frequency of forced refresh and raise coding efficiency also in cases where a more sophisticated error suppression method is employed on the decoding side.

Accordingly, an object of the present invention is to provide a moving-picture coding apparatus and method through which a conspicuous decline in image quality is avoided without lowering coding efficiency even in an environment in which error occurs in coded data during transmission.

According to an aspect of the present invention, there is provided a moving-picture coding apparatus for adaptively selecting and using intraframe coding or interframe predictive coding in small blocks. The apparatus comprises: data-loss probability estimating means for counting, per small block, distance from a synchronizing pattern that is inserted into coded data, and estimating, from the count, data-loss probability that coded data of a target small block will be lost during transmission thereof;

image-quality degradation estimating means for estimating, in regard to a small block in which interframe predictive coding has been performed, degree of image-quality degradation that will be caused in this small block in a decoded image in a case where data has been lost during transmission thereof;

a forced refresh map for calculating a forced refresh priority of each small block upon comparing the estimated data-loss probability and estimated degree of image-quality degradation with threshold values, and recording a value of priority calculated for each small block of an entire image frame; and mode control means for referring to recorded values of priority when a subsequent frame is to be coded and selecting a small block in which intraframe coding is to be forcibly performed based upon the recorded values of priority.

The moving-picture coding apparatus may further comprise a counter that counts the distance from the synchronizing pattern per small block, wherein the data-loss probability estimating means calculates an estimated value of data-loss probability as a monotonously increasing function of the value of distance based upon the count output by the counter.

The counter may count, as the value of distance, amount of code or number of coded blocks between the synchronizing pattern and a target small block, wherein the data-loss probability estimating means calculates estimated probability of data loss as a monotonously increasing function of the amount of code or number of coded blocks.

In estimating the degree of image-quality degradation that will be caused in the above-mentioned small block in a decoded image in a case where the coded data of this small block in which interframe predictive coding has been performed has been lost during transmission, the degree of image-quality degradation may be calculated from any one of: (a) power of prediction error in a case where the target small block has been subjected to simple interframe prediction, (b) power of prediction error in a case where the target small block has been subjected to motion-compensated interframe prediction, and magnitude of a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

Further, according to a second aspect of the present invention, there is provided a moving-picture coding method for adaptively selecting and using intraframe coding or interframe predictive coding in small blocks. The method comprises:

a data-loss probability estimating step of counting, per small block, distance from a synchronizing pattern that is inserted into coded data, and estimating, from the count, data-loss probability that coded data of a target small block will be lost during transmission;

an image-quality degradation estimating step of estimating, in regard to a small block in which interframe predictive coding has been performed, degree of image-quality degradation that will be caused in this small block in a decoded image in a case where the coded data has been lost during transmission;

a forced refresh map creation step of calculating a forced refresh priority of each small block upon comparing the estimated data-loss probability and estimated degree of image-quality degradation with threshold values, and recording a value of priority calculated for each small block of an entire image frame; and a mode control step of referring to recorded values of priority when a subsequent frame is to be coded and selecting a small block in which intraframe coding is to be forcibly performed based upon the recorded values of priority.

The data-loss probability estimating step may calculate an estimated value of data-loss probability as a monotonously increasing function of the value of distance based upon a value obtained by counting, per small block, the distance from the synchronizing pattern.

The count serving as the value of distance may be obtained by counting amount of code or number of coded blocks between the synchronizing pattern and a target small block, wherein the data-loss probability estimating step calculates estimated probability of data loss as a monotonously increasing function of the amount of code or number of coded blocks.

In estimating the degree of image-quality degradation that will be caused in the above-mentioned small block in a decoded image in a case where the coded-data of this small block in which interframe predictive coding has been performed has been lost during transmission, the degree of image-quality degradation may be calculated from any one of: (a) power of prediction error in a case where the target small block has been subjected to simple interframe prediction, (b) Power of prediction error in a case where the target small block has been subjected to motion-compensated interframe prediction, and magnitude of a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

Other features and advantages of the present invention will be apparent from the following description taken in conjunction with the accompanying drawings, in which like reference characters designate the same or similar parts throughout the figures thereof.

PREFERRED EMBODIMENTS OF THE INVENTION

A first embodiment of a moving-picture coding apparatus and method according to the present invention will now be described in detail with reference to FIGS. 1 to 7.

Figure 1:
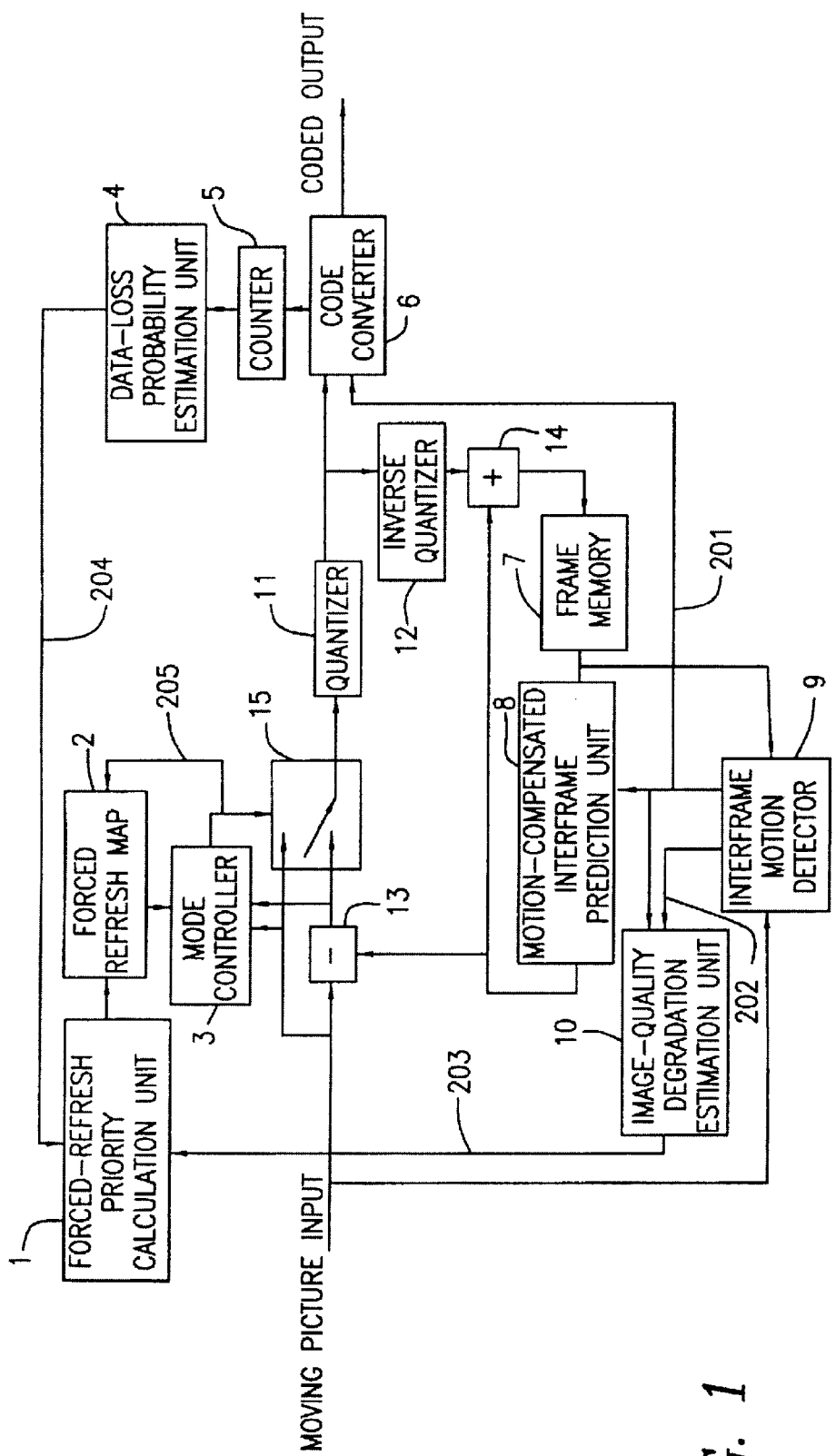
FIG. 1 is a block diagram illustrating an embodiment of a moving-picture coding apparatus and method according to the present invention.

FIG. 1 is a block diagram illustrating an embodiment of a moving-picture coding apparatus and method according to the present invention. As shown in FIG. 1, the moving-picture coding apparatus includes a priority calculation unit 1 for calculating forced refresh priority, a forced refresh map 2, a mode controller 3, a data-loss probability estimation unit 4, a counter 5, a code converter 6, a frame memory 7, a motion-compensated interframe prediction unit 8, an interframe motion detector 9, an image-quality degradation estimation unit 10, a quantizer 11, an inverse quantizer 12, a subtractor 13, an adder 14 and a switch 15.

The priority calculation unit 1 refers to an estimated value 203 of image quality degradation and a value 204 of estimated probability of data loss, judges the probability that data of a target small block will be lost and the degree of image quality degradation if loss has occurred, and decides the value of priority at which this small block is subjected to forced refresh. The value of priority is recorded in the forced refresh map 2.

A value indicating the priority at which forced refresh is performed is recorded in the forced refresh map 2 per small block in the image frame. The values of priority are updated through a process in which a series of frames of a moving image is coded.

In the processing for coding the current frame, the mode controller 3 refers to the forced refresh priority that was recorded in the forced refresh map 2 in the preceding frame, selects several small blocks of high priority from the entirety of one frame, and forcibly codes these small blocks in the intraframe coding mode. The number of small blocks to be selected is decided through a predetermined procedure proportional to the coding bit rate or to the error rate of the transmission line, etc.

The data-loss probability estimation unit 4 calculates an estimation of data-loss probability as a monotonously increasing function of the value of distance between a position at which a synchronizing pattern has been inserted and a target small block.

The counter 5, which monitors coded data produced by the code converter 6, measures the amount of code in an interval or the number of blocks in an interval as the distance between the position at which the synchronizing pattern has been inserted and a target small block. The value output by the counter indicates the distance between the synchronizing pattern inserted into the coded data and the small block of interest and is used in calculating the probability that the coded data of this small block will be lost due to an error during transmission of the data. The synchronizing pattern (code) is inserted in the leading end of the coded data of one image frame, or at the beginning of a video packet, in which the coded data of a plurality of small blocks is bundled, or a video slice.

The code converter 6 generated coded data, and the frame memory 7 stores image data.

The motion-compensated interframe prediction unit 8 is a processor for performing motion-compensated interframe predictive coding using a motion vector.

The interframe motion detector 9 refers to an image that has been read out of the frame memory 7, detects motion between frames of the input image and outputs a motion vector 201 indicative of the motion of each small block. Further, the interframe motion detector 9 outputs data 202 indicating the power of interframe prediction error obtained in the course of motion detection. The error data represents prediction error in a case where motion-compensated interframe prediction has been performed using a motion vector or prediction error in a case where motion is regarded as being zero and simple interframe prediction has been performed.

The image-quality degradation estimation unit 10 refers to the motion vector 201 and motion-compensated interframe prediction error data 202 and estimates the degree of image quality degradation in a case where the coded data of a target small block has been lost.

The switch 15 responds to refreshing of the forced refresh map 2 by selecting a small block in which intraframe coding is to be performed.

The interframe motion detector 9 in the moving-picture coding apparatus constituted by the above-described components refers to an image that has been read out of the frame memory 7, detects motion between frames of the input image and outputs the motion vector 201 indicative of the motion of each small block. The interframe motion detector 9 further outputs the motion-compensated interframe prediction error data 202 obtained in the course of motion detection. This error data represents prediction error in a case where motion-compensated interframe prediction has been performed using a motion vector, or prediction error in a case where motion is regarded as being zero and simple interframe prediction has been performed.

The image-quality degradation estimation unit 10 refers to the motion vector 201 and motion-compensated interframe prediction error data 202 and estimates the degree of image quality degradation in a case where the coded data of a target small block has been lost. The counter 5 measures the distance from the synchronizing pattern of the target small block and estimates, from the measured value of distance, the probability that data of this small block will be lost. The priority calculation unit 1 refers to the estimated value 203 of image quality degradation and the value 204 of estimated probability of data loss, judges the probability that data of a target small block will be lost and the degree of image quality degradation if loss has occurred, and decides the value of priority at which this small block is subjected to forced reset. The value of priority is recorded in the forced refresh map 2.

Next, in the processing for coding the current frame, the mode controller 3 refers to the forced refresh priority that was recorded in the forced refresh map 2 in the preceding frame, selects several small blocks of high priority from the entirety of one frame, and forcibly codes these small blocks in the intraframe coding mode. The number of small blocks to be selected, which is decided through a predetermined procedure, is proportional to the coding bit rate or to the error rate of the transmission line, etc. In regard to a small block for which forced refresh has not been selected, the mode controller 3 compares the coding efficiency of intraframe coding with that of interframe predictive coding and exercises control in such a manner that mode having the higher efficiency is selected. In a case where the intraframe coding mode has been selected in the course of a series of mode selections, the forced refresh priority of the small block of interest is reset to the lowest level by coding-mode control signal 205. The subtractor 13, adder 14 and other processing units shown in FIG. 1 operate in a manner similar to like components in an ordinary moving-picture coding apparatus.

The operation of this embodiment of the present invention will now be described.

Figure 2:
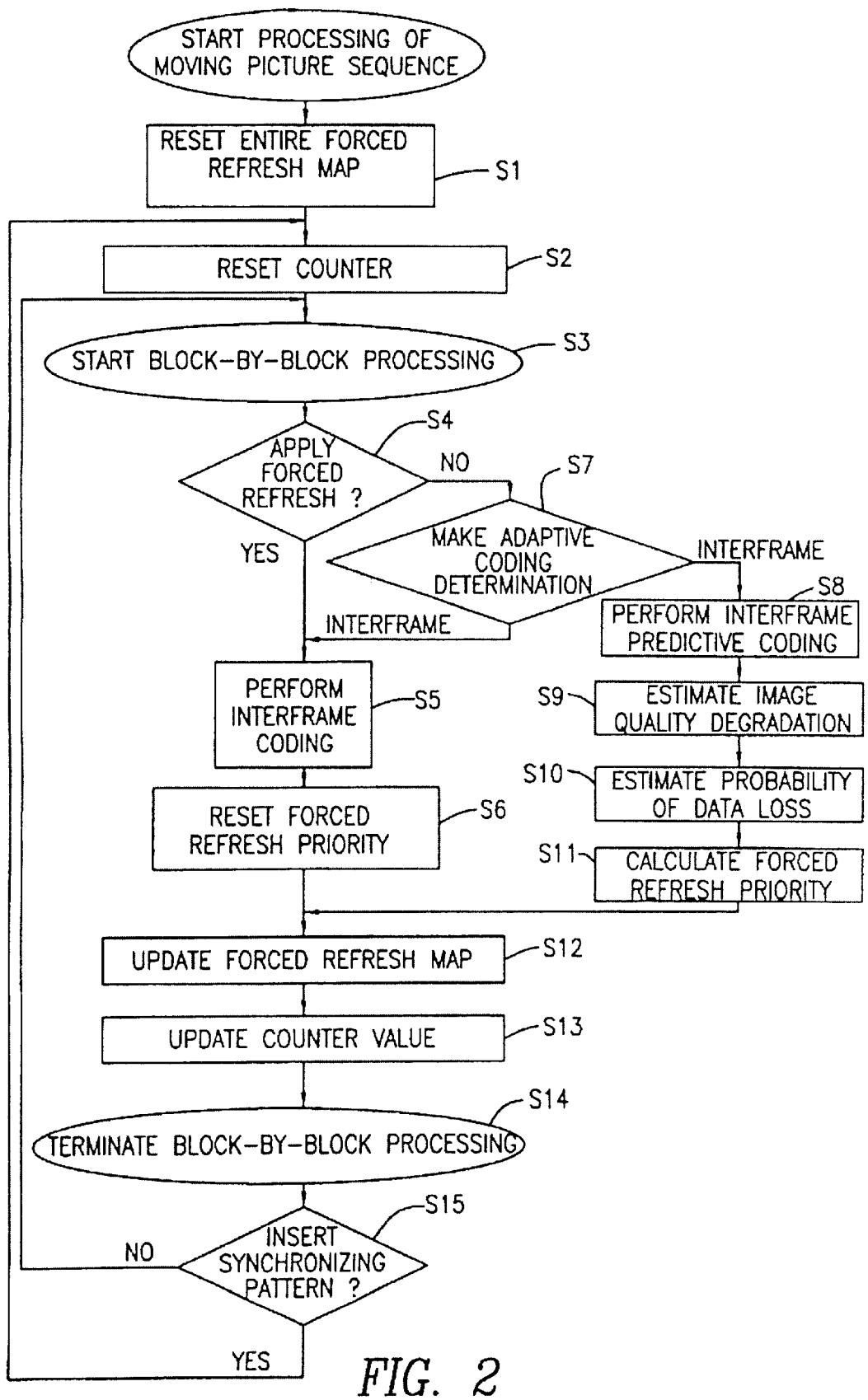
FIG. 2 is a flowchart illustrating processing according to this embodiment.

FIG. 2 is a flowchart illustrating the flow of processing in the moving-picture coding apparatus and method according to this embodiment. The processing procedure will be described in detail with reference to FIG. 2.

When the coding of a moving picture starts, first the forced refresh map 2 is reset (S1). A value indicating the priority at which forced refresh is performed is stored in the forced refresh map 2 per small block of the image frame. The values of priority are updated in the process of coding a series of frames of the moving image.

Next, the counter 5 which indicates the position of a target small block is reset (S2). The value recorded by the counter 5 indicates the distance between the synchronizing pattern inserted into the coded data and the target small block and is used in calculating the probability that the coded data of this small block will be lost due to an error during transmission of the-data. The synchronizing pattern is inserted in the leading end of the coded data of one image frame, or at the beginning of a video packet, in which the coded data of a plurality of small blocks is bundled, or a video slice.

Next, a coding processing loop for the coding of each small block in one frame is executed (S3). First, it is determined whether a target small block is a candidate for forced refresh (S4). This determination involves referring to the forced refresh map 2. A small block determined to be a candidate for forced refresh is coded in the intraframe coding mode (S5). In other cases, it is determined whether adaptive coding is to be applied. Either the intraframe coding mode or interframe predictive coding mode, whichever provides the higher coding efficiency, is selected (S7).

A small block for which the intraframe coding mode has been selected through either determination has the value of its forced refresh priority reset to the lowest level (S6). In regard to a small block for which the interframe predictive coding mode has been selected (S8), on the other hand, the degree of image quality degradation that will be sustained at loss of data is estimated (S9). Further, the probability of data loss of the target small block is estimated (predicted) (S10). Next, the refresh priority of this small block is re-calculated from the estimated probability of data loss and the estimated value of image quality degradation (S11). The forced refresh map 2 is then updated by the value of priority obtained for each small block (S13).

This ends the series of processing steps for the small block (S14). Here the value in the counter is updated before control returns to the beginning of the coding processing loop. However, first it is determined whether the synchronizing pattern has been inserted in front of (or ahead) the next small block (S15). If the pattern has been inserted, the value in the counter is reset (S2) and then control returns to the coding processing of the next small block (S3).

By repeating the foregoing series of processing steps for every small block and every frame (S2–S15), control of forced refresh can be performed automatically.

In the moving-picture coding method for adaptively selecting and using intraframe coding or interframe predictive coding in small blocks in accordance with this embodiment, the probability that data loss will occur due to error during transmission of coded data is estimated block by small block and the degree of image quality degradation that will be caused in a decoded image if the coded that is lost because of error is estimated block by small block, and selection of small blocks in which forced refresh is to be carried out is control led upon referring to the estimated probability of data loss and the estimated degree of image degradation. Performing this refresh control efficiently makes it possible to suppress a decline in image quality due to error while minimizing a decline in coding efficiency. This embodiment has the data-loss probability estimation unit 4 and the image-quality degradation estimation unit 10, which are components not found in the prior art. The reason why these means are necessary will be described in detail with reference to FIGS. 3, 4, 5, 6 and 7.

Figure 3A:
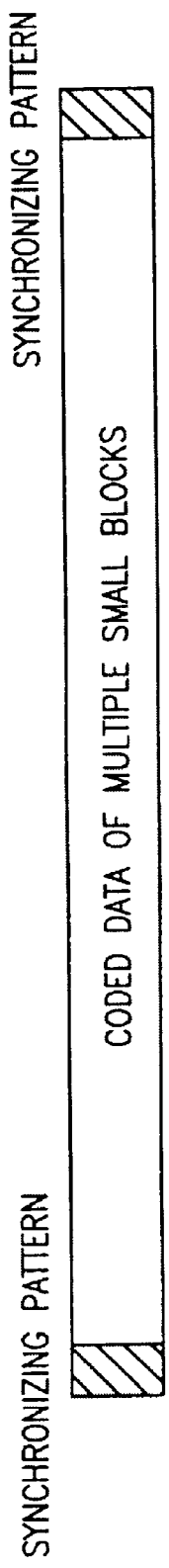
FIG. 3 is a diagram useful in describing the manner in which some coded data is lost owing to the occurrence of error during transmission.
Figure 3B:
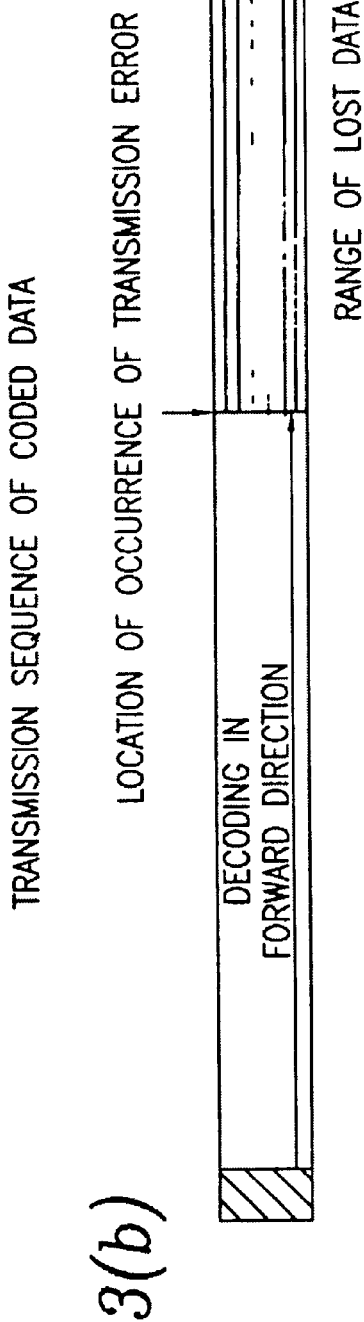
Figure 3C:
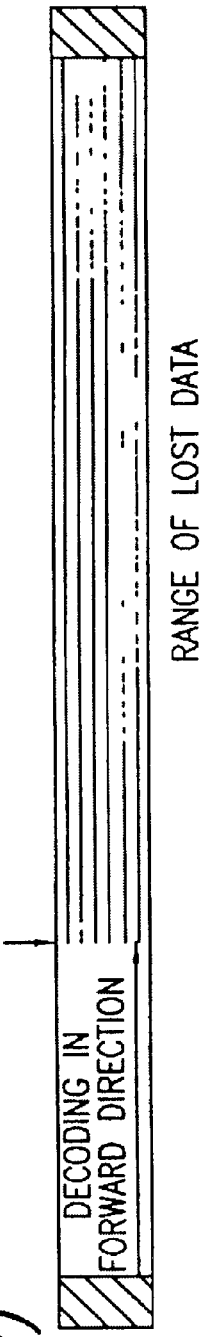

The fundamentals of data-loss probability estimation will be described first. FIG. 3 illustrates the manner in which some coded data is lost owing to the occurrence of error during transmission of the data. As shown in (a) of FIG. 3, a plurality of small blocks of coded data are arranged between synchronizing patterns. Cases in which transmission error has occurred temporarily during transmission of this coded data are illustrated in FIG. 3(b) and (c). Many apparatus and methods for coding moving pictures employ a variable-length code conversion scheme. Consequently, when an error occurs at a point somewhere along continuous coded data, synchronization with decoding processing is lost and it becomes impossible to decode all coded data from the position at which the error occurred to the position of the next synchronizing pattern. Accordingly, though the position at which error occurs is random, the greater the distance of the data from the immediately preceding synchronizing pattern, the higher the probability of data loss accompanying the occurrence of the error. FIG. 3 exemplifies this relationship.

Figure 4A:
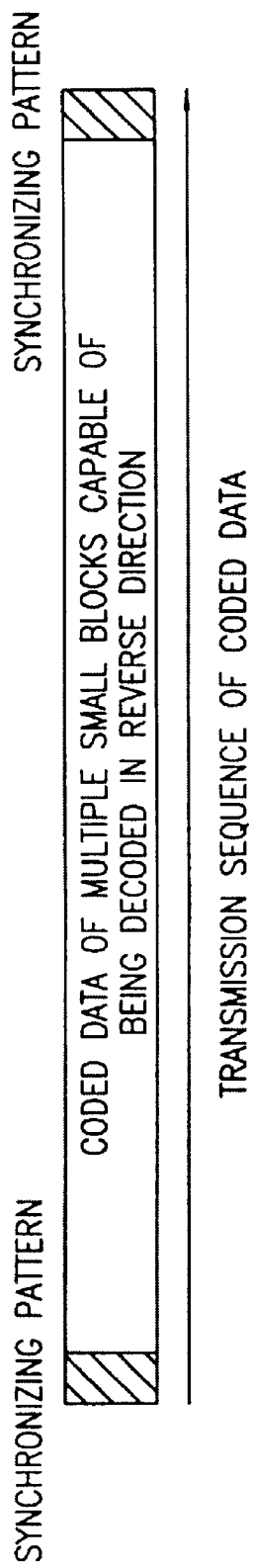
FIG. 4 is a diagram useful in describing the manner in which some coded data is lost owing to the occurrence of error during transmission.
Figure 4B:
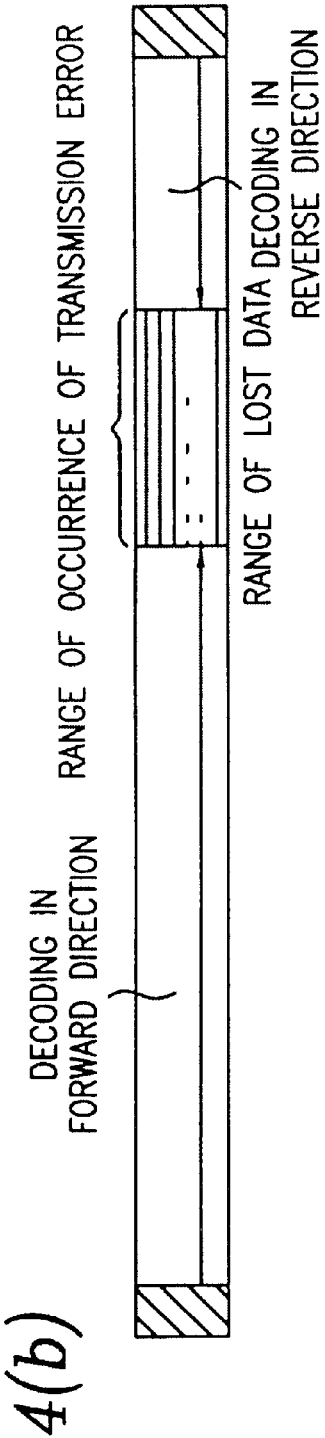
Figure 4C:
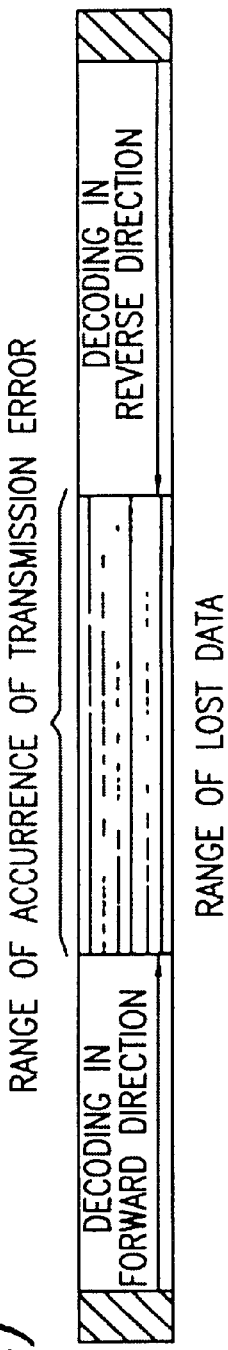

FIG. 4 similarly illustrates the manner in which some coded data is lost owing to the occurrence of error during transmission of the data. However, FIG. 4 shows a case where the coded data is different from that of FIG. 3, namely a case where use is made of a variable-length code conversion scheme in which decoding is possible also in the reverse direction. When an error occurs part way along the coded image data, decoding processing jumps from this point to the next synchronizing pattern and then is executed in the reverse direction from this position. As a result, the range over which data is lost can be limited to that near the portion of the data at which the error actually occurred. Accordingly, if the distance to either of the two synchronizing patterns is short, the probability of data loss is low. A small block for which the distance from either of the synchronizing patterns is great receives the adverse influence of the error comparatively strongly.

Thus, in a case where an error has occurred at a point part way along the coded data, the probability that data in a certain small block will be lost can be represented by a monotonously increasing function of distance from a synchronizing pattern, as described above with reference to FIGS. 3 and 4.

Figure 5A:
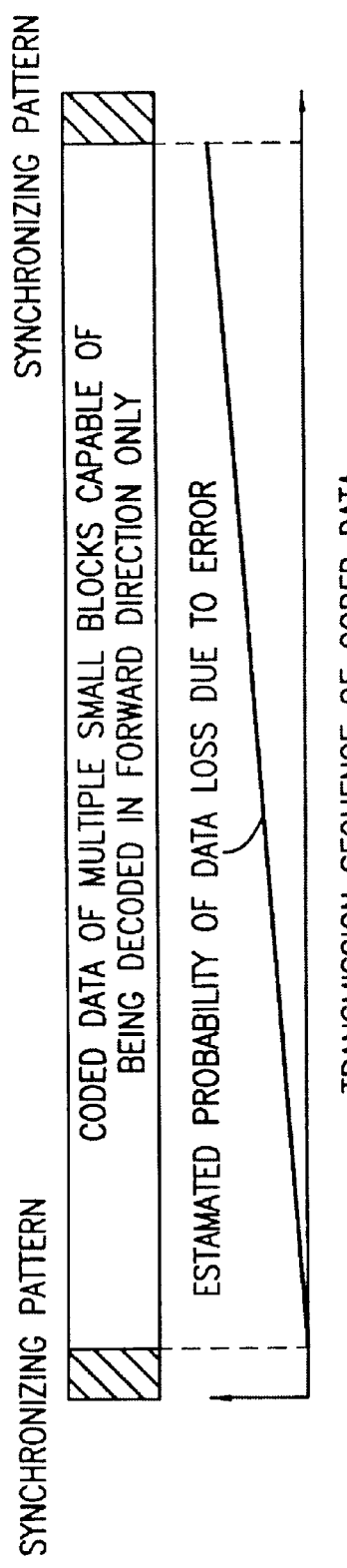
FIG. 5 is a diagram useful in describing estimation of probability that some coded data will be lost owing to the occurrence of error during transmission.
Figure 5B:
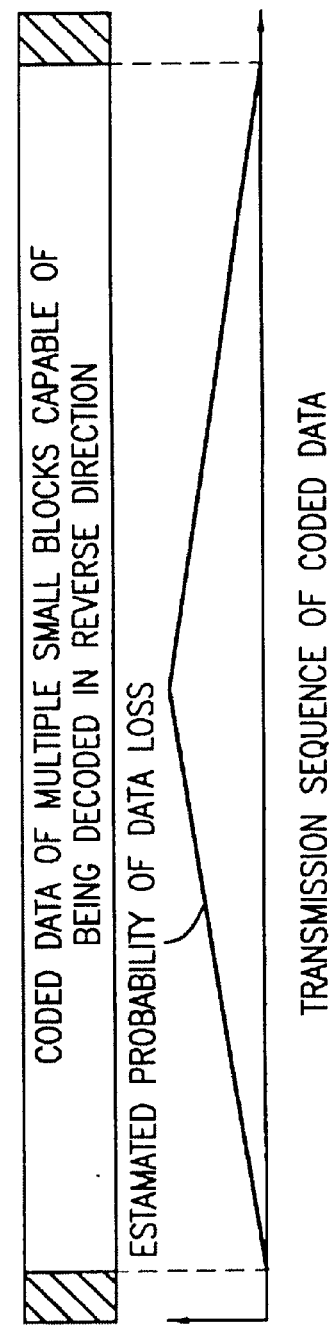

FIG. 5 illustrates an example in which the probability of loss of data of a small block in coded data is estimated in accordance with the above-described principle. An example of estimated probability in a case where decoding is possible only in the forward direction is illustrated in FIG. 5(a). The greater the distance of the position of a small block from the immediately preceding synchronizing pattern, the higher the estimated probability of loss of data due to error. An example of estimated probability in a case where decoding is possible also in the reverse direction is illustrated in FIG. 5(b). Here the probability of loss of data is estimated based upon distance from whichever of the two synchronizing patterns is nearest. The distance between the target small block and a synchronizing pattern can be counted by measuring the amount of code from the synchronizing pattern to this small block or by counting the number of coded small blocks from the synchronizing pattern to this small block. Control is exercised in such a manner that a small block judged to have a high probability of occurrence of error based upon the count will be forcibly refreshed at a comparatively high priority.

Next, the necessity of estimating the degree of degradation in image quality and the principle thereof will be described. According to this embodiment, it is presumed that error suppression processing more sophisticated than that of the prior art can be used on the decoding side.

Figure 6:
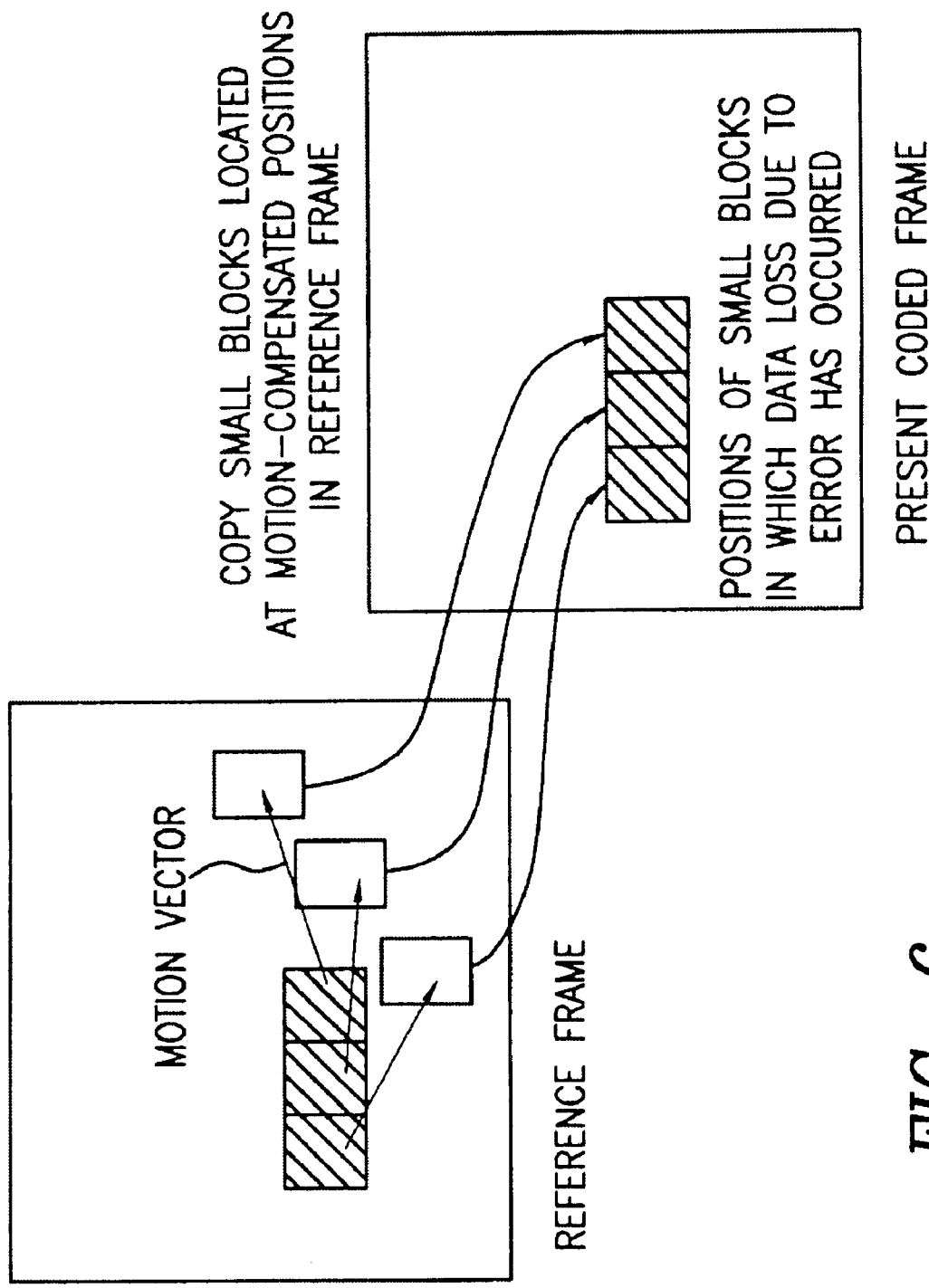
FIG. 6 is a diagram useful in describing a method of error suppression using motion-compensated interframe prediction.
Figure 7:
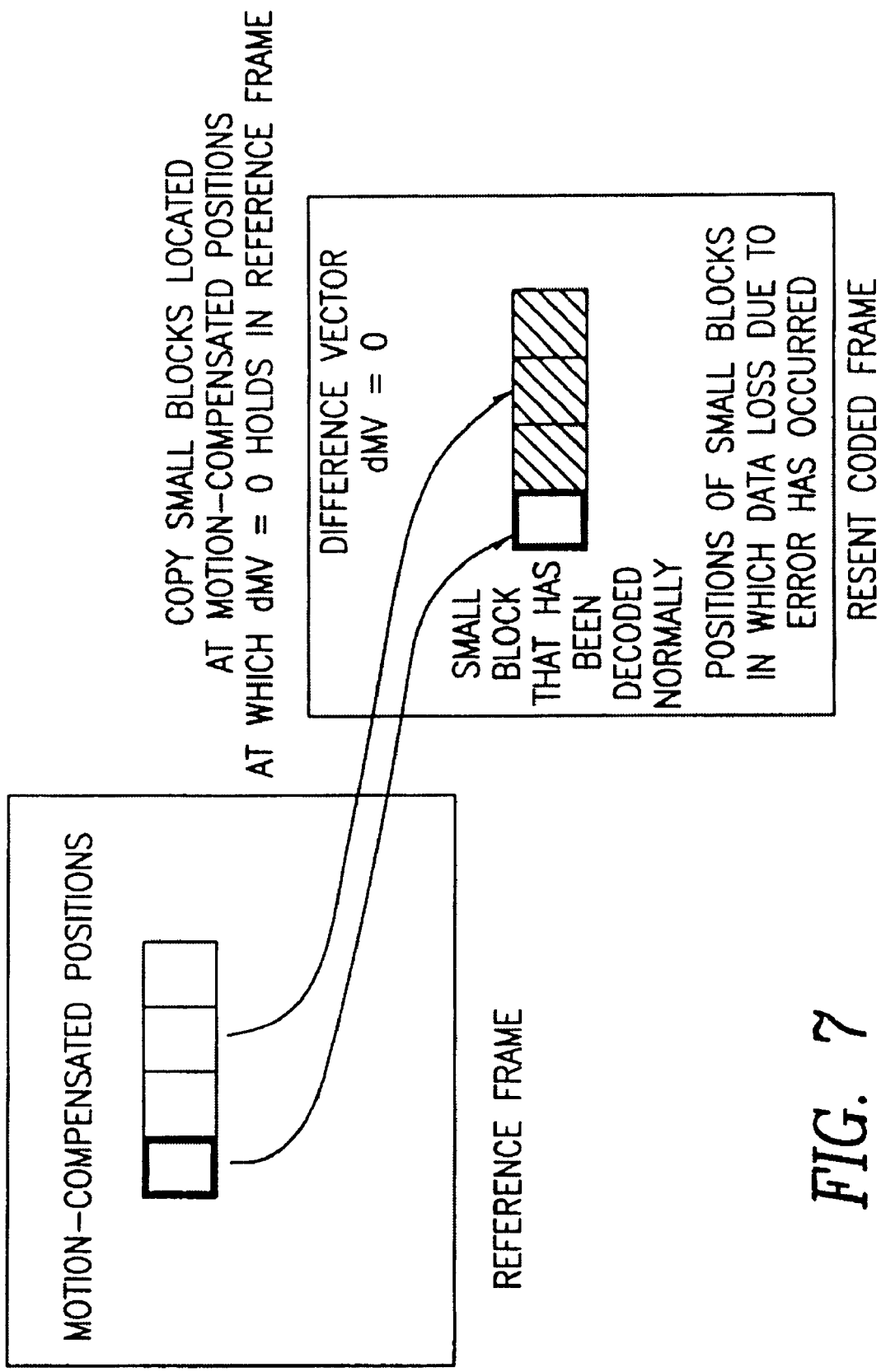
FIG. 7 is a diagram useful in describing a method of error suppression using motion-compensated interframe prediction.
Figure 8:
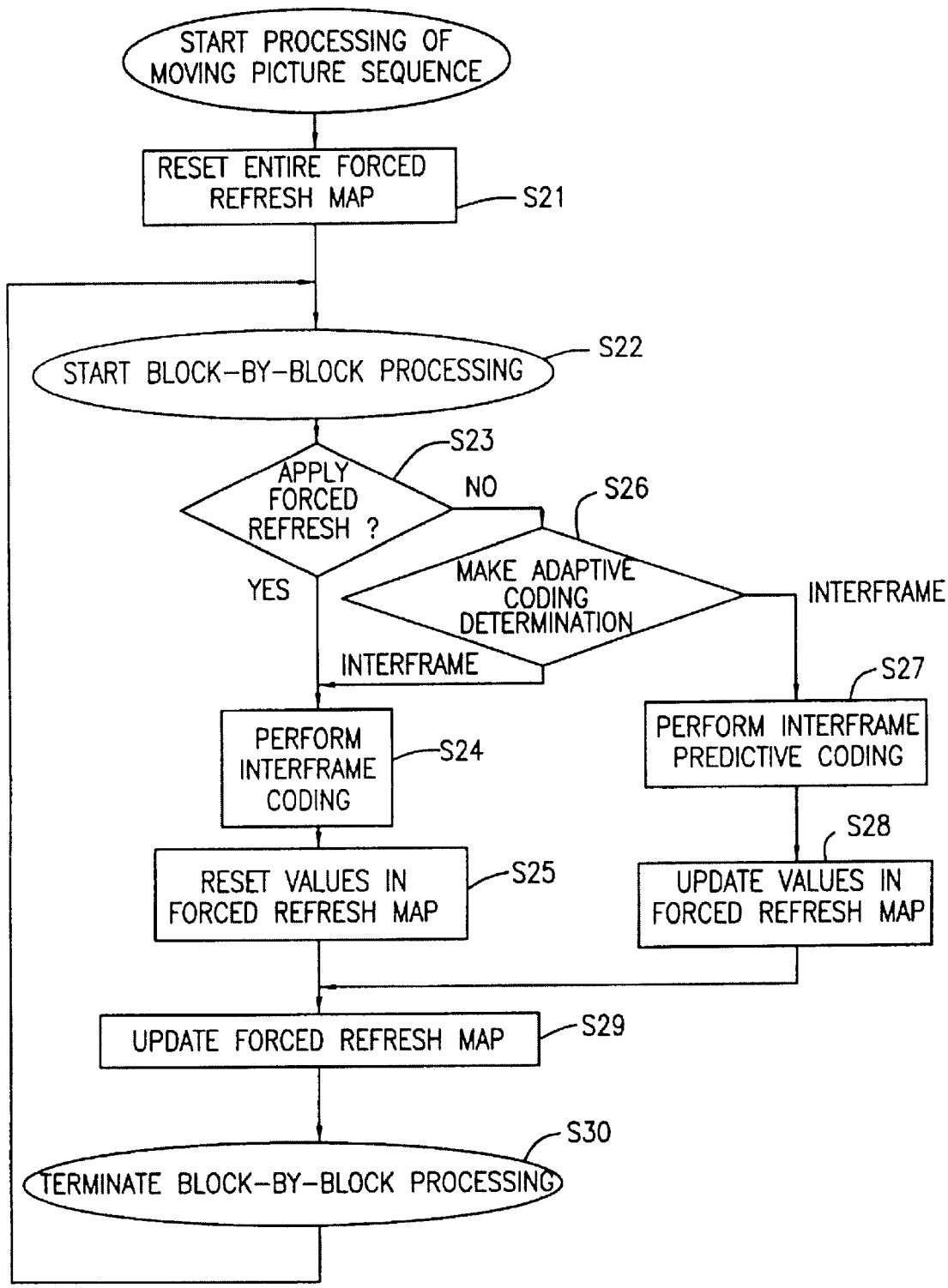
FIG. 8 is a flowchart illustrating processing according to the prior art.
Figure 9:
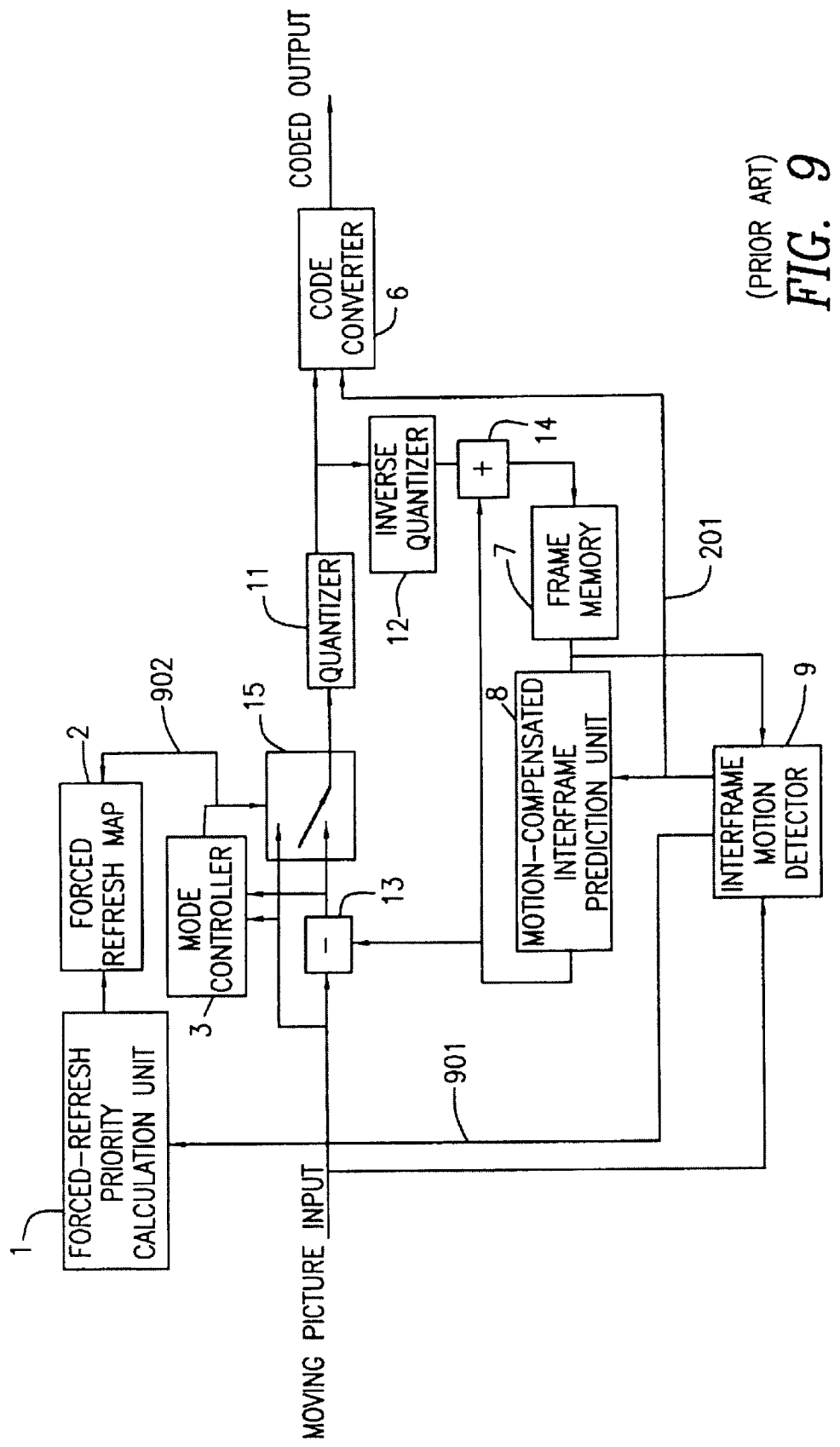
FIG. 9 is a block diagram illustrating an example of the construction of a moving-picture coding apparatus according to the prior art.
Figure 10:
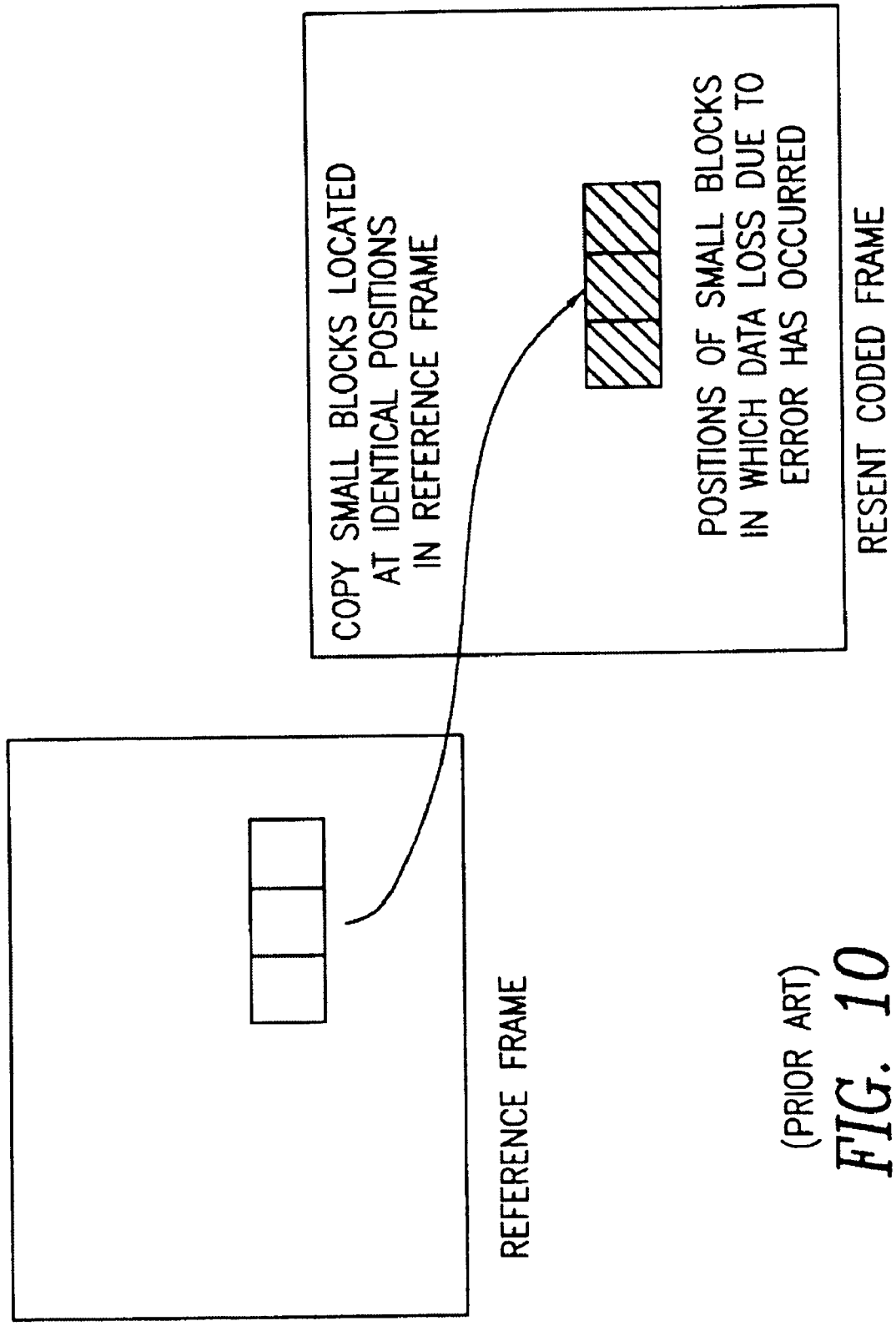
FIG. 10 is a diagram useful in describing a method of error suppression using interframe prediction according to the prior art.

FIGS. 6 and 7 illustrate examples of processing applied to three small blocks in which loss of data has occurred. With the conventional method described above with reference to FIG. 10, it is assumed that motion and prediction error are zero across the board for small blocks in which data has been lost, and the images of the small blocks at identical positions in the reference frame are copied as is. As a consequence, a highly conspicuous decline in image quality is brought about when there is motion in a small block in which data has been lost. FIG. 6 illustrates error suppression processing in a case where only the data of motion vectors could be decoded. Small blocks, for which the prediction error is assumed to be zero, at motion-compensated positions in the reference frame are copied by motion-compensated interframe prediction, and the small blocks are interpolated to the present coded frame. In accordance with this method, local motion of the image can be reproduced. This makes it possible to suppress a decline in image quality to an extent greater than with the prior-art example of FIG. 10.

Depending upon the moving-picture coding apparatus and method, only the motion-vector data can be collected together and arranged close to a synchronizing pattern and a code array that is less likely to experience data loss than other coded data can be utilized. This error suppression method of coding a moving picture is particularly effective in such cases.

FIG. 7 illustrates an example of error suppression in a case where even the motion-vector data has been lost. In FIG. 7, use is made of motion vector(s) of preceding small block or blocks that could be decoded normally prior to the occurrence of an error. In regard to a small block that has sustained loss of data, it is assumed that a difference vector between this small block and a normal small block is zero, and data obtained by motion-compensated interframe prediction is interpolated from the reference frame. This method promises an error suppression effect for dealing with motion over a large area spanning adjacent small blocks. Thus, if the sophisticated error suppression method described above in connection with FIGS. 6 and 7 is utilized, it is possible to obtain a decoded image in which a decline in image quality is less noticeable in comparison with the prior-art method. The image-quality degradation estimation unit 10 shown in FIG. 1 estimates the degree of degradation in image quality in a case where this methodicated error suppression method is utilized and improves the efficiency of the forced refresh operation.

The details of the method of estimating image quality degradation will be described next. In a case where the error suppression method of FIG. 6 is used, the power of the prediction error of motion-compensated interframe predictive coding in which actual coding has been used is taken as the degree of degradation in image quality when data is lost. Further, by using this in combination with the magnitude of the motion vector, the precision with which the degradation in image quality at the time of data loss is estimated can be improved. If the magnitude of the motion vector is large, the degradation in image quality in a case where error suppression has failed will also be large. The degree of degradation in image quality, therefore, is defined by a monotonously increasing function of both the power of prediction error and the magnitude of the motion vector. The method using the motion vector in this manner is particularly effective in cases where it is unclear as to whether the error suppression method of FIG. 6 can be used on the decoding side.

The error suppression processing of FIG. 7 copies small blocks at the motion-compensated position for which dMV=0 holds in the processed frame. In other words, if this error suppression method is used, what is taken as the degree of degradation in image quality is the power of the prediction error of motion-compensated interframe predictive coding in a case where the difference vector of the target block is taken as being zero. This method is such that if the magnitude of the actually coded difference vector is large, it can be expected that there will be an increase also in image quality degradation in a case where error suppression has failed. Accordingly, degree of degradation in image quality can be estimated as a monotonously increasing function of both the power of prediction error and the magnitude of the difference vector.

According to the coding method of the present invention, the components described above can be used in combination. If the probability that data will be lost due to error is high and data has actually been lost, small blocks in which the decline in image quality is highly conspicuous are selected efficiently and forced refresh is applied to these small blocks to quickly eliminate the adverse effects of the error. Conversely, control can be exercised in such a manner that small blocks which are not likely to experience error or in which a decline in image quality is not readily noticeable even if data is lost are not subjected to forced refresh needlessly, as a result of which there is no adverse impact upon coding efficiency.

A second embodiment of the present invention will now be described in detail with reference to FIG. 1.

According to the second embodiment, the coded data generated by the code converter 6 is monitored in the counter 5 of FIG. 1 and the amount of code in an interval is measured as the distance between the position at which the synchronizing pattern has been inserted and a target small block. In the case of FIG. 5($a$), the distance is from the target small block to the synchronizing pattern coded immediately before. In the case of FIG. 5($b$), the distance that can be used is that from the target small block to the closest synchronizing pattern (or code) on either side. The data-loss probability estimation unit 4 computes the estimated probability of loss of data as a monotonously increasing function of this amount of code.

By way of example, estimated probability P of data loss of a target small block is given by the following equation:

$$P = Pm \times (A \times C / B + D)$$

where A represents the amount of code, B the average amount of code between two neighboring synchronizing patterns and Pm the average data-loss probability at the time of present observation. The constants C and D are coefficients predetermined so that the average of P will be Pm.

FIG. 5($a$) illustrates a case where C=1, D=0 hold. Alternatively, if C=0, D=1 hold, then P=Pm will hold and control identical with that of the prior-art method described earlier can be implemented. A more practical approach is to obtain statistical data of the probability of data loss block by block in a case where error has occurred randomly and then design a function based upon this statistical data.

The value of forced refresh priority of the target small block is updated based upon this calculated probability of data loss of the target small block. The value of priority is updated so as to increase the priority if the estimated probability of data loss is greater than a predetermined threshold value. A plurality of threshold values may be set in advance and the priority may be divided up into several levels depending upon the relationship between the value of probability and each of the threshold values. Furthermore, the values of priority may be accumulated in order to reflect past history. The value of priority is reset to the lowest level when the target small block has been coded in the intraframe coding mode.

A third embodiment of the present invention will now be described in detail with reference to FIG. 1.

According to the third embodiment, the coded data generated by the code converter 6 is monitored in the counter 5 of FIG. 1 and the number of small blocks actually coded in an interval is counted as the distance between the position at which the synchronizing pattern has been inserted and a target small block. The probability of loss of data is estimated as a monotonously increasing function of the number of coded blocks.

By way of example, estimated probability P of data loss of a target small block is given by the following equation:

$$P = Pm \times (E \times G/F + H)$$

where E represents the number of blocks, F the average number of blocks between two neighboring synchronizing patterns, and Pm the average data-loss probability at the time of present observation.

The constants G and H are coefficients predetermined so that the average of P will be Pm.

The value of forced refresh priority of the target small block is updated based upon this calculated probability of data loss of the target small block. The updating method can be implemented in a manner similar to that of the second embodiment.

A fourth embodiment of the present invention will now be described in detail with reference to FIG. 1.

According to the fourth embodiment, the value of the power of prediction error in interframe prediction in a case where the motion vector is assumed to be zero by the interframe motion detector 9 of FIG. 1 is calculated and applied to the image-quality degradation estimation unit 10. On the basis of this value, the image-quality degradation estimation unit 10 estimates the degree of degradation in image quality in a case where the coded data of the target small block has been lost. More specifically, if the value of power is greater than a predetermined threshold value, the degree of degradation is regarded as being pronounced. The forced refresh priority of a small block for which degradation is regarded as being pronounced is updated to a higher value.

A fifth embodiment of the present invention will now be described in detail with reference to FIG. 1.

According to the fifth embodiment, the value of a motion vector that has been used in actual coding and the value of the power of prediction error in motion-compensated interframe prediction in a case where the motion vector has been used are calculated by the interframe motion detector 9 and applied to the image-quality degradation estimation unit 10.

On the basis of these values, the image-quality degradation estimation unit 10 estimates the degree of degradation in image quality in a case where the coded data of the target small block has been lost. More specifically, if the value of power is large or the value of the motion vector is large, the degree of degradation is regarded as being pronounced. The estimated degree of degradation is obtained by taking the sum or product of the result of threshold-value processing of the error power and the result of threshold-value processing of the value of the motion vector. The forced refresh priority of a small block for which degradation is regarded as being pronounced is updated to a higher value. If the probability of loss of the coded data of a motion vector is sufficiently lower than the probability that the data of interframe prediction error will be lost, the value of the motion vector need not be referred to when estimating the degradation of image quality.

A sixth embodiment of the present invention will now be described in detail with reference to FIG. 1.

According to the sixth embodiment, the value of a motion vector that has been used in actual coding and the value of the power of prediction error in motion-compensated interframe prediction are calculated and applied to the image-quality degradation estimation unit 10. The value of the motion vector is utilized upon effecting a conversion to a difference vector following a prediction made between neighboring blocks. Reference is had to these values to estimate the degree of image quality degradation in a case where the coded data of a target block has been lost.

More specifically, if the value of power is large or the value of the difference vector is large, the degree of degradation is regarded as being pronounced. The degree of degradation can be estimated through a method the same as that of the fifth embodiment. The forced refresh priority of a small block for which degradation is regarded as being pronounced is updated to a higher value. If the probability of loss of the coded data of a motion vector is sufficiently lower than the probability that the data of interframe prediction error will be lost, the value of the difference vector need not be referred to when estimating the degradation of image quality.

Thus, in accordance with the motion-picture coding apparatus and method of the present invention, as should be evident from the foregoing description, coding is controlled in such a manner that the probability that data will be lost and the degradation in image quality in case of such loss are estimated, block by small block, on the coding side, and small blocks for which a conspicuous degradation in image quality has been predicted at a high probability are subjected to forced refresh preferentially, whereby image quality is recovered more quickly. As a result, when some coded data is lost owing to the occurrence of an error, the degradation in image quality can be suppressed more effectively.

Further, control is performed in such a manner that the probability that data will be lost and the degradation in image quality in case of such loss are estimated, block by small block, on the coding side, and small blocks for which the probability of loss of data is low or for which the image quality degradation will not be readily conspicuous even if data is lost are not subjected to forced refresh. As a result, forced refresh of a large quantity of generated code need not be used needlessly. This means that the adverse impact upon overall coding efficiency is suppressed regardless of the use of forced refresh.

As many apparently widely different embodiments of the present invention can be made without departing from the spirit and scope thereof, it is to be understood that the invention is not limited to the specific embodiments thereof except as defined in the appended claims.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A moving-picture coding apparatus for adaptively selecting and using intraframe coding or interframe predictive coding in small blocks, comprising:

data-loss probability estimating means for counting, per small block, distance of the small block from a synchronizing pattern that is inserted into coded data, and estimating, from the count, data-loss probability that coded data of a target small block will be lost during transmission thereof;

image-quality degradation estimating means for estimating, in regard to a small block wherein interframe predictive coding has been performed, degree of image-quality degradation that will be caused in this small block in a decoded image in a case where coded data has been lost during transmission thereof;

a forced refresh map for calculating a forced refresh priority of each small block upon comparing the estimated data-loss probability and estimated degree of image-quality degradation with respective ones of threshold values, and recording a value of priority calculated for each small block of an entire image frame; and mode control means for referring to recorded values of priority when a subsequent frame is to be coded and selecting a small block in which intraframe coding is to be forcibly performed based upon the recorded values of priority.

2. The apparatus according to claim 1, further comprising a counter counting the distance from the synchronizing pattern per small block;

wherein said data-loss probability estimating means calculates an estimated value of data-loss probability as a monotonously increasing function of the value of distance based upon the count output by said counter.

3. The apparatus according to claim 2, wherein said counter counts, as a value of the distance, amount of code or number of coded blocks between the synchronizing pattern and a target small block;

wherein said data-loss probability estimating means calculates estimated probability of data loss as a monotonously increasing function of the amount of code or number of coded blocks.

4. The apparatus according to claim 2, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude of a motion vector used in this motion compensation; and (c) power of prediction error in a case where the target small block has been subjected to motion-compensated interframe prediction, and magnitude of a difference vector between a motion vector used in this motion compensation and a motion vector of an adjacent small block.

5. The apparatus according to claim 3, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude of a motion vector used in this motion compensation; and (c) power of prediction error in a case where the target small block has been subjected to motion-compensated interframe prediction, and magnitude of a difference vector between a motion vector used in this motion compensation and a motion vector of an adjacent small block.

6. The apparatus according to claim 1, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude of a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

7. A moving-picture coding method for adaptively selecting and using intraframe coding or interframe predictive coding in small blocks, comprising:

a data-loss probability estimating step of counting, per small block, distance from a synchronizing pattern that is inserted into coded data, and estimating, from the count, data-loss probability that coded data of a target small block will be lost during transmission thereof;

an image-quality degradation estimating step of estimating, in regard to a small block in which interframe predictive coding has been performed, degree of image-quality degradation that will be caused in this small block in a decoded image in a case where coded data has been lost during transmission thereof;

a forced refresh map creation step of calculating a forced refresh priority of each small block upon comparing the estimated data-loss probability and estimated degree of image-quality degradation with respective ones of threshold values, and recording a value of priority calculated for each small block of an entire image frame; and a mode control step of referring to recorded values of priority when a subsequent frame is to be coded and selecting a small block in which intraframe coding is to be forcibly performed based upon the recorded values of priority.

8. The method according to claim 7, wherein said data-loss probability estimating step calculates an estimated value of data-loss probability as a monotonously increasing function of the value of distance based upon a value obtained by counting, per small block, the distance of the block from the synchronizing pattern.

9. The method according to claim 8, wherein the count serving as the value of distance is obtained by counting amount of code or number of coded blocks between the synchronizing pattern and a target small block;

said data-loss probability estimating step calculating estimated probability of data loss as a monotonously increasing function of the amount of code or number of coded blocks.

10. The method according to claim 8, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

11. The method according to claim 9, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

12. The method according to claim 7, wherein in estimating the degree of image-quality degradation that will be caused in a small block, in which interframe predictive coding has been performed, in a case where the coded data of this small block has been lost, the degree of image-quality degradation is estimated by calculating it from any one of:

(a) power of prediction error in a case where the target small block has been subjected to simple interframe prediction, (b) power of prediction error in a case where the target small block has been subjected to motion-compensated interframe prediction, and magnitude a motion vector used in this motion compensation, and (c) power of prediction error in a case where the target small block has been subjected to motion-compensated interframe prediction, and magnitude of a difference vector between a motion vector used in this motion compensation and a motion vector of an adjacent small block.

* * * * *